UNITED STATES PATENT OFFICE

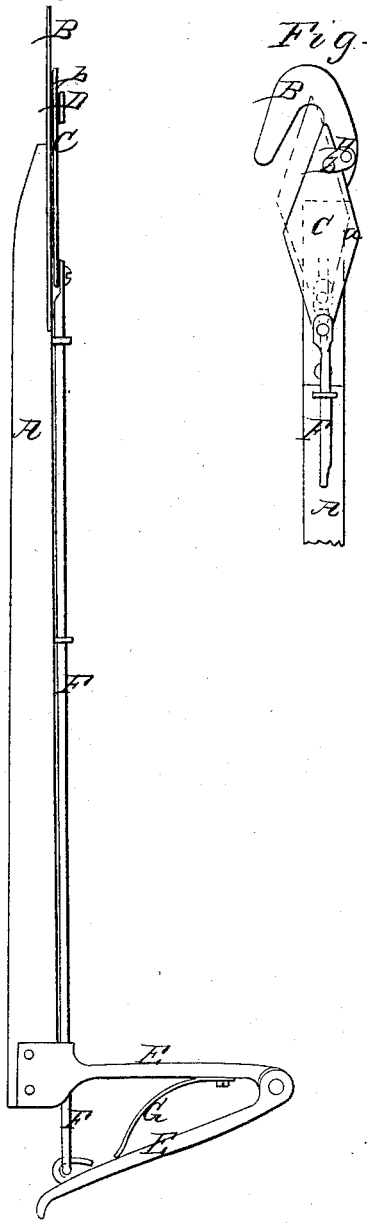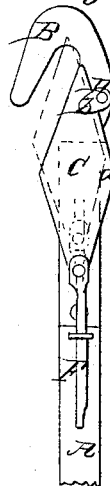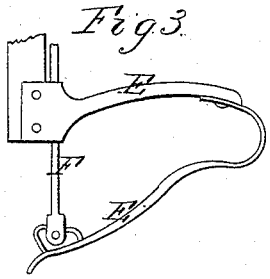

JOSEPH EVANS, OF NEWARK, AND ROBERT H. SEYMOUR, OF BLOOMFIELD, ASSIGNORS TO HENRY SEYMOUR, OF ELIZABETH, NEW JERSEY.

IMPROVEMENT IN PRUNING-INSTRUMENTS.

Specification forming part of Letters Patent No. 57,817, dated September 4, 1866.

*To all whom it may concern:*

Be it known that we, JOSEPH EVANS, of Newark, in the county of Essex and State of New Jersey, and ROBERT H. SEYMOUR, of Bloomfield, in the county of Essex and State of New Jersey, have invented a new and useful Improvement in Pruning-Shears; and we do hereby declare that the following is a full, clear, and exact description thereof, which will enable others skilled in the art to make and use the same, reference being had to the accompanying drawings, forming part of this specification, in which—

Figure 1 is a front elevation of the cutting part of our pruning-shears. Fig. 2 is an edge elevation, showing more particularly the means employed for operating the cutter. Fig. 3 is a modification of Fig. 2.

Similar letters of reference indicate like parts.

Our invention consists in constructing a cutter-blade, to be used in combination with a hook, with a groove running along one of its sides in such direction that when the blade is propelled, it being guided by a pin working in the said groove, it will have a drawing cut of peculiar motion and effect, as will be hereinafter described.

It also consists in the employment, in combination with pruning-knives, of a spring-lever, to be located at or near the end of the pole taken hold of by the operator, and capable of driving the knife forward by pressing together the two bows or arms of the lever, as will be hereinafter described.

A designates the handle of this instrument, to one of whose ends is secured a metallic hook, B, whose shape is shown clearly in Fig. 1.

C is the cutting-blade. This is of a diamond shape, and when it rests upon the hook its two longer points are in a direction parallel with the length of the device. A groove, a, is made along the upper edge of the back of the blade.

D is a guiding or clamping piece, which extends over the blade, and it carries a pin, b, whose point rests in the groove a, and this guides the blades.

The clamping-piece D and pin b are so located with reference to the blade that, on the blade being pushed forward, it will be turned or diverted from a straight line, so as to give a drawing cut, and in such manner as to gradually throw the twig away from the bend in the hook, but not in a degree which would incur any risk of its not being properly severed; hence the twig is not likely to be wedged in the bend of the hook, and, inasmuch as the knife operates gradually with a drawing cut, the twig is more easily and quickly severed. This particular motion of the cutter with reference to the hook is not shown in any other device, so far as we are aware.

E E' designate the two arms of the spring-lever employed for operating the knife. These arms are jointed together at one end, and the lever E is secured in any proper manner to the handle of the implement. To the loose end of that E' there is connected a rod, F, which is carried along the handle to the lower corner of the blade, to which it is jointed.

A spring, G, Fig. 2, is placed between the two levers, so as to keep them pressed apart, in order to cause the arm E', through the medium of the rod F, to always keep the blade drawn down to a proper position for permitting a twig to be caught in the hook, and to be ready for commencing the cutting operation.

It will thus be seen that by merely pressing together the two arms E E' of the spring-lever the knife is propelled, and a great deal of power can be exerted for propelling the knife, as is evident.

In addition to the compression of the hand, the weight of the body may be exerted for compressing the levers for forcing the blade through a tough twig or branch. In Fig. 3 we have shown in red a modification of this last feature of our invention. In this the spring G, between the levers E E', is dispensed with, the lever E' being constructed so as to itself answer the purpose of a spring.

If it be found desirable, a roller may be employed under the guiding-piece D. Such roller would permit the blade to travel along, but keep it always pressed down upon the hook.

What we claim as new, and desire to secure by Letters Patent, is—

1. Constructing the cutting-blade C with a groove, a, along its upper back edge, and so arranging, in combination therewith, a cap or clamp, D, carrying a pin, b, that the blade will be guided so that it will operate upon the twig with a drawing cut in a direction from the bend in the hook, substantially as described.

2. The spring-lever E E', in combination with the cutting-blade of a pruning-knife, constructed and applied substantially as described, whereby the knife may be operated in a quick and easy manner.

3. The combination, with each other, of the diamond-shaped knife C, hook B, rod F, and spring-levers E E', arranged and operating substantially as herein shown and described.

The above specification of our invention signed by us this 24th day of April, 1866.

JOSEPH EVANS.
R. H. SEYMOUR.

Witnesses:
M. M. LIVINGSTON,
F. A. JACKSON.